Figure 1:
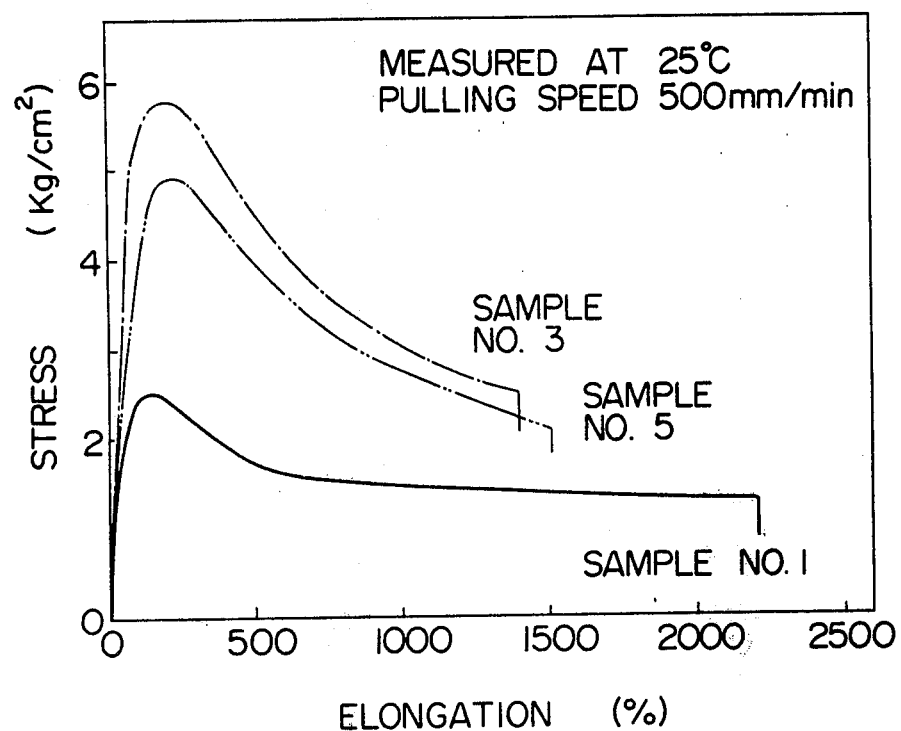

United States Patent [19]

Ueda et al.

[11] 4,166,083
[45] Aug. 28, 1979

[54] RUBBER COMPOSITION AND PROCESS FOR PREPARATION THEREOF

[75] Inventors: Akio Ueda; Keiji Komuro, both of Yokohama, Japan

[73] Assignee: Nippon Zeon Co. Ltd., Tokyo, Japan

[21] Appl. No.: 880,594

[22] Filed: Feb. 23, 1978

[30] Foreign Application Priority Data

Mar. 4, 1977 [JP] Japan .................................. 52-23450
Mar. 4, 1977 [JP] Japan .................................. 52-23451

[51] Int. Cl.² .......................... C08L 9/02; C08L 23/16
[52] U.S. Cl. .............................. 260/33.6 AQ; 526/281; 525/210
[58] Field of Search ............... 260/888, 889, 894, 896, 260/897 R, 897 A; 526/281

[56] References Cited

U.S. PATENT DOCUMENTS

| | | | |
|---|---|---|---|
| 3,646,168 | 2/1972 | Barrett | 260/889 |
| 3,830,881 | 8/1974 | Woods et al. | 260/889 |
| 3,852,225 | 12/1974 | Ishikawa et al. | 260/889 |

Primary Examiner—J. Ziegler
Attorney, Agent, or Firm—Sherman & Shalloway

[57] ABSTRACT

A blended rubber composition comprising
(a) 70 to 95% by weight of at least one diene rubber, and
(b) 30 to 5% by weight of a polymer or copolymer obtained by polymerizing at least one norbornene compound expressed by the general formula

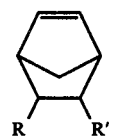

wherein R and R', independently from each other, represent a hydrogen atom, an alkyl group with 1 to 4 carbon atoms, and alkoxy group with 1 to 4 carbon atoms or the group —OCOCH₃.

10 Claims, 2 Drawing Figures

RUBBER COMPOSITION AND PROCESS FOR PREPARATION THEREOF

This invention relates to a rubber composition containing a polymer of a norbornene compound. More specifically, the invention relates to a blended composition of a diene rubber and a polymer of a norbornene compound which has a high green strength and gives a vulcanized rubber having improved properties.

The green strength of rubber compounds and the tensile modulus, abrasion resistance, wet skid resistance, etc. of vulcanized rubbers prepared from the rubber compounds are extremely important for tire rubber compounds. Attempts have been made to improve these characteristics by various methods such as (1) a method which comprises mixing rubbers or resins having different glass transition temperatures with diene rubbers (Dutch Patent Application No. 68.07047) and a method which comprises reacting with rubber a dicarboxylic acid (U.S. Pat. No. 3,527,376) or a compound having a polar group such as a nitroso group [K. M. Davies et al., Rev. Gen. Caout. Plast., 52 (11), 823 (1975)]. With the method (1), a mixture designed for improving green strength can give a vulcanized rubber having improved tensile modulus, but frequently, its abrasion resistance is reduced, or heat build up, which is another important characteristic of rubber compositions for tires, increases. With a mixture designed for improving abrasion strength, the wet skid resistance and tensile modulus are frequently reduced. On the other hand, the method (2) involving the introduction of a polar group makes it possible to improve green strength and tensile modulus, but cannot improve wet skid resistance at the same time. Furthermore, this method has the disadvantage of requiring special steps in performing a reaction for introducing polar groups.

In the circumstances, it has been desired in the art to obtain by a simple method a blended rubber composition having certain improved properties without a deterioration in its processability and in the balance of the properties of a cured product of the composition.

It is an object of this invention therefore to provide a blended rubber composition having markedly improved green strength and being capable of giving vulcanized products having markedly improved tensile modulus, abrasion resistance and wet skid resistance.

The present inventors extensively worked on the aforesaid subject, and consequently found that by mixing a diene rubber with a norbornene polymer or copolymer having a glass transition temperature of 0° C. or higher and being resinous at room temperature in such a manner that no poor dispersion occurs, the green strength of the blended rubber composition can be markedly improved without a reduction in processability, and the tensile modulus and abrasion resistance and at times, wet skid resistance of a cured product of the composition can also be markedly improved without the impairment of its low heat build up and its tensile strength.

Thus, according to this invention, there is provided a blended composition comprising (a) 70 to 95% by weight of at least one diene rubber and (b) 30 to 5% by weight of a polymer or copolymer (sometimes to be referred to generically as a norbornene polymer) obtained by polymerizing at least one norbornene compound expressed by the general formula

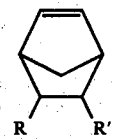

wherein R and R', independently from each other, represent a hydrogen atom, an alkyl group with 1 to 4 carbon atoms, an alkoxy group with 1 to 4 carbon atoms or the group —OCOCH$_3$.

The diene rubber (a) in the composition of this invention includes, for example, isoprene rubber, styrene-butadiene copolymer rubber, acrylonitrile-butadiene copolymer rubber, butadiene rubber, styrene-piperylene-butadiene copolymer rubber, ethylene-propylene-diene copolymer rubber and cycloolefin rubber, and mixtures of these. The ethylene-propylene-diene copolymer rubber means an ethylene-propylene copolymer rubber containing a curable structural unit derived from a diene monomer such as ethylidene norbornene or dicyclopentadiene. The cycloolefin rubber denotes a polymer obtained by the ring-opening polymerization of a cycloolefin, i.e. "polyalkenamer", and includes polypentenamer, polyheptenamer and polyoctenamer, and mixtures thereof.

The norbornene polymer (b) to be incorporated in the diene rubber (a) in this invention can be prepared by the ring-opening polymerization of at least one norbornene compound of the above formula in accordance, for example, with the method disclosed in Michelotti, et al., J. Polymer Sci., 3, 895–905 (1965). Specific examples of the norbornene compound are 5-norbornene, 5-norbornene-2-methyl, 5-norbornene-2-ethyl, 5-norbornene-2-butyl, 2-methoxy-5-norbornene, 2-ethoxy-5-norbornene, 2-isobutoxy-5-norbornene, 2,3-dimethyl-5-norbornene, an acetic acid ester of 5-norbornene-2-ol, and an acetic acid ester of 5-norbornene-2,3-diol, and mixtures of these.

All of the norbornene polymers (b) have a glass transition temperature of at least 0° C. and a molecular weight of as high as at least several hundred thousand. Such a norbornene polymer (b) tends to have poor dispersibility when mixed with the diene rubber (a) by means of mixers, such as a mixing roll and Banbury mixer, used commonly in the rubber industry. To better the dispersibility of the norbornene polymer (b), it should preferably be softened with process oils commonly used in the rubber industry before mixing with the diene rubber (a). For example, a blended rubber composition having good dispersibility can be obtained without an adverse effect on its processability by first softening 100 parts by weight of the norbornene polymer (b) with 10 to 200 parts by weight, preferably 30 to 100 parts by weight, according to the glass transition temperature and molecular weight of the norbornene polymer, of a naphthenic or aromatic process oil, and then mixing the resulting product and the diene rubber (a) in predetermined amounts calculated as polymer. Addition of the process oil can be achieved easily by swelling the norbornene polymer (b) with the process oil, and then kneading the swollen polymer by a mixing roll heated at 60° to 100° C.

A blended composition having the norbornene polymer (b) uniformly dispersed in the diene rubber (a) can also be obtained by mixing a solution of the norbornene polymer (b) in a hydrocarbon solvent with a polymerized cement of the diene rubber (a), and then removing the solvent by steam stripping.

The blending proportions are such that the amount of the diene rubber (a) is 70 to 95% by weight, and the amount of the norbornene polymer (b) is 30 to 5% by weight. If the amount of the norbornene polymer (b) is less than 5% by weight, the effect of the present invention is not appreciable, and when it exceeds 30% by weight, the processability of the blended composition and the elasticity of a vulcanized product of the composition are impaired.

The blended rubber composition of this invention can be vulcanized by adding compounding agents which are commonly used in the rubber industry, such as carbon blacks, sulfur, vulcanization accelerators, vulcanization aids, and organic peroxides. In all cases, the green strength of the composition and the tensile modulus and abrasion resistance and at times, wet skid resistance of the vulcanized product can be improved markedly over a diene rubber composition not containing the norbornene polymer (b).

The following examples illustrate the present invention more specifically.

Example 1

It can be seen from FIG. 1 and Table 2 that by blending the norbornene polymer with the diene rubber, the green strengths (maximum stress) of the blended rubber compositions can be improved without an increase in compound Mooney, and the 100% tensile moduli, 300% tensile moduli and abrasion resistances of cured products of the compositions can be improved.

Table 1

| Sample No. | Comparison | Invention | | | |
|---|---|---|---|---|---|
| Compounding recipe (parts by weight) | 1 | 2 | 3 | 4 | 5 |
| Cis 1,4-polyisoprene rubber | 100 | 90 | 80 | 90 | 80 |
| Oil-extended norbornene polymer I | — | 10 | 20 | — | — |
| Oil-extended norbornene polymer II | — | — | — | 10 | 20 |
| Zinc oxide | 3 | | | | |
| Stearic acid | 2 | | | | |
| HAF carbon black | 50 | | | | |
| High aromatic oil | 5 | | | | |
| Sulfur | 2.3 | | | | |
| N-oxydiethylene-2-benzothiazole (sulfenamide (Vulcanizing accelerator MSA) | 1 | | | | |
| Phenyl-β-naphthylamine (Antioxidant D) | 1 | | | | |

Table 2

| Sample No. Physical properties | Comparison 1 | Invention | | | |
|---|---|---|---|---|---|
| | | 2 | 3 | 4 | 5 |
| Compound Mooney (ML$_{1+4/100°}$ C.) | 62.0 | 61.5 | 63.0 | 62.5 | 63.5 |
| Green strength (maximum stress) (kg/cm$^2$) | 2.5 | 4.1 | 5.7 | 3.7 | 4.9 |
| Tensile strength (kg/cm$^2$) | 285 | 283 | 273 | 280 | 272 |
| 100% Tensile modulus (kg/cm$^2$) | 31 | 42 | 50 | 39 | 46 |
| 300% Tensile modulus (kg/cm$^2$) | 142 | 168 | 184 | 160 | 173 |
| *Amount of abrasion in Pico test (cc) | 0.023 | 0.022 | 0.021 | 0.021 | 0.021 |

*ASTM D-2228 (1969), 60 rpm, load 4.5 kg

Sixty parts by weight of a naphthenic process oil (CIRCO LIGHT, a trademark for a product of Sun Oil Company, U.S.A.), was caused to be absorbed by 100 parts by weight of a norbornene polymer (polymer of 5-norbornene, NORSOREX, a trademark for a product of CdF Company, France) at 50° 60° C. for 2 hours. The norbornene polymer was then kneaded on a mixing roll heated at 80° to 90° C. to prepare an oil-extended norbornene polymer I.

Synthetic cis-1,4-polyisoprene rubber (NIPOL IR 2200, a trademark for a product of Nippon Zeon Co., Ltd.) and the oil-extended norbornene polymer I were mixed by a B-type Banbury mixer in the proportions shown in Table 1. Various compounding agents were mixed in the amounts shown in Table 1 per 100 parts by weight of the diene rubber and the norbornene polymer combined to afford blended rubber compositions.

An oil-extended norbornene polymer II was prepared in the same way as described above except that the amount of the napthenic process oil was changed to 80 parts by weight, and the oil-extended norbornene polymer II was used instead of the oil-extended norbornene polymer I, to afford blended rubber compositions.

The stress-elongation curves at room temperature of blended compositions (samples Nos. 1, 3 and 5 in Table 1) are shown in FIG. 1 of the accompanying drawings.

The green strengths (maximum stress) and compound Mooneys of the blended compositions shown in Table 1 and the tensile strengths, tensile moduli and abrasion in Pico test of vulcanized products (obtained by pressing at 145° C. for 25 minutes) of these compositions are given in Table 2.

EXAMPLE 2

An oil-extended styrene-butadiene copolymer rubber (SBR 1712; containing 37.5% by weight of a high aromatic oil) and the oil-extended norbornene polymer I or II prepared in Example 1 were mixed by a B-type Banbury mixer in the proportions shown in Table 3. At the same time, various compounding agents in the amounts shown in Table 3 per 100 parts by weight of the materials combined, to afford blended rubber compositions.

Figure 2:
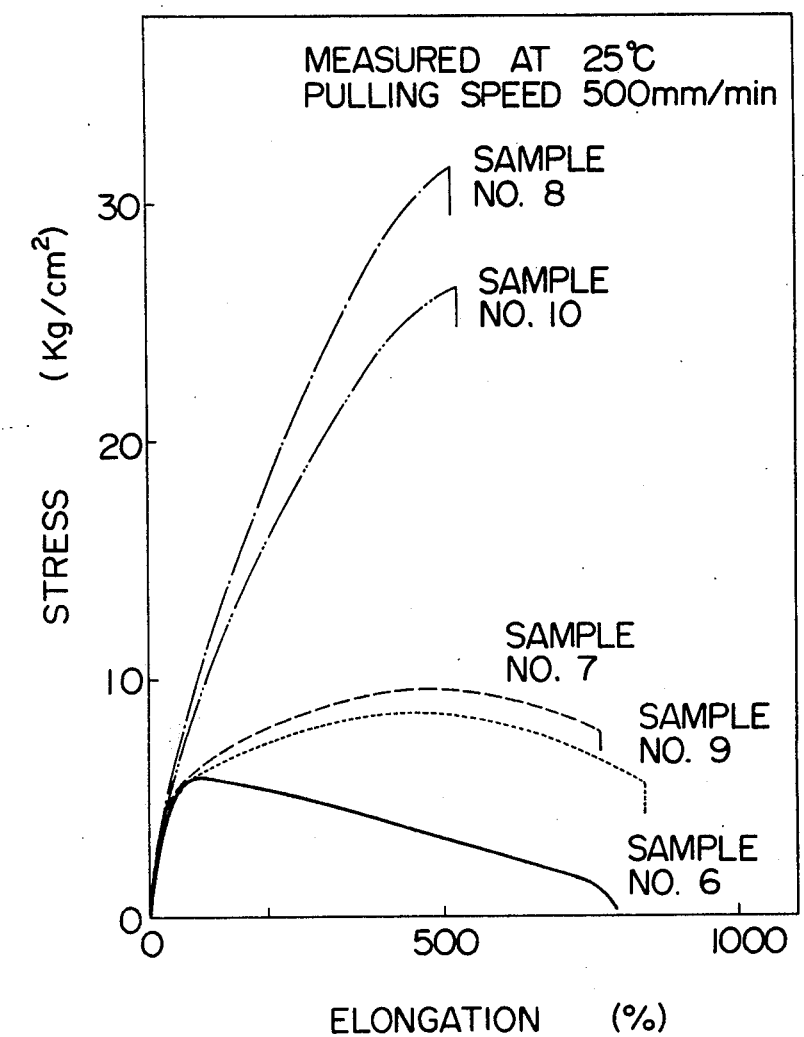

The stress-elongation curves at room temperature of the blended compositions in Table 3 are shown in FIG. 2.

Cured products obtained by pressing the resulting compositions at 145° C. for 45 minutes were tested for tensile strength, elongation, tensile modulus, heat build up, abrasion in Pico test and wet skid resistance, and the results are shown in Table 4.

The results given in Table 4 and FIG. 2 show that by incorporating the norbornene polymer in the diene rubber, the green strengths of the rubber compositions are improved, and the 300% tensile moduli, abrasion resistances and wet skid resistances of the cured products of these compositions are markedly improved without a sacrifice in their tensile strength and heat build up.

Table 3

| Sample No. | Comparison | Invention | | | |
|---|---|---|---|---|---|
| Compounding recipe parts by weight | 6 | 7 | 8 | 9 | 10 |
| SBR 1712 | 100 | 90 | 8 | 90 | 80 |

Table 3-continued

| Sample No. | Comparison | Invention | | | |
|---|---|---|---|---|---|
| Compounding recipe parts by weight | 6 | 7 | 8 | 9 | 10 |
| Oil extended norbornene polymer I | — | 10 | 20 | — | — |
| Oil extended norbornene polymer II | — | — | — | 10 | 20 |
| Zinc oxide | 3 | | | | |
| Stearic acid | 2 | | | | |
| ISAF carbon black | 60 | | | | |
| High aromatic oil | 5 | | | | |
| Sulfur | 1.7 | | | | |
| Vulcanizing accelerator MSA | 1.1 | | | | |
| Antioxidant 810NA* | 1.0 | | | | |
| Anitioxidant D | 1.0 | | | | |
| Antioxidane AW** | 1.0 | | | | |

*N-phenyl N-isopropyl-p-phenylenediamine
**6-ethoxy-2,2,4-trimethyl-1,2-dihydroquinoline

Table 4

| Sample No. | | Comparison | Invention | | | |
|---|---|---|---|---|---|---|
| Physical properties | | 6 | 7 | 8 | 9 | 10 |
| Tensile strength | (kg/cm$^2$) | 216 | 200 | 212 | 212 | 195 |
| Elongaton | (%) | 430 | 380 | 330 | 420 | 320 |
| 300% tensile modulus | (kg/cm$^2$) | 145 | 156 | 189 | 155 | 179 |
| *Heat build up | (°C.) | 26.5 | 26.0 | 27.5 | 27.5 | 26.5 |
| Amount of abrasion in Pico test | (cc) | 0.021 | 0.020 | 0.018 | 0.019 | 0.019 |
| **Wet skid resistance | | 47 | 55 | 54 | 54 | 53 |

*ASTM D-623-58 Method A, 1800 rpm, load 25 lbs, stroke 0.175 inch, 100° C., 25 minutes.
**ASTM E-303-69, concrete surface in the wet state.

EXAMPLE 3

Oil-extended cis-polybutadiene rubber (BR 1441; containing 37.5% by weight of a high aromatic oil) and the oil-extended norbornene polymer I prepared in Example 1 were mixed by a B-type Banbury mixer in the proportions shown in Table 5 to afford blended rubber compositions. Furthermore, oil-extended cis-polybutadiene rubber (BR 1441), the oil-extended styrene-butadiene copolymer rubber (SBR 1712 used in Example 2), and the oil-extended norbornene polymer I prepared in Example 1 were mixed in the same manner as above to afford blended rubber compositions.

Cured products obtained by pressing these blended rubber compositions at 145° C. for 45 minutes were tested for tensile strength, 100% tensile modulus, abrasion in Pico test and wet skid resistance, and the results obtained are shown in Table 5.

It can be seen from Table 5 that the addition of the norbornene polymer to the diene rubber can bring about an improvement in tensile strength abrasion resistance and wet skid resistance.

Table 5

| Sample No. | | Comparison | Invention | | Comparison | Invention |
|---|---|---|---|---|---|---|
| Compositions, Physical Properties | | 11 | 12 | 13 | 14 | 15 15 |
| BR 1441 | | 100 | 80 | 70 | 30 | 30 |
| SBR 1712 | | — | — | — | 70 | 60 |
| Oil extended norbornene polymer I | | — | 20 | 30 | —10 | |
| Tensile strength | (kg/cm$^2$) | 167 | 169 | 171 | 205 | 201 |
| 100% tensile modulus | (kg/cm$^2$) | 19 | 30 | 4 | 22 | 25 |
| Amount of abrasion in Pico test | (cc) | 0.011 | 0.009 | 0.007 | 0.015 | 0.012 |
| Wet skid resistance | | 44 | 47 | 47 | 46 | 50 |

What we claim is:

1. A blended rubber composition comprising
(a) 70 to 95% by weight of at least one diene rubber, and
(b) 30 to 5% by weight of (i) a homopolymer obtained by polymerizing one norbornene compound expressed by the general formula

wherein R and R', independently from each other, represent a hydrogen atom, and alkyl group with 1 to 4 carbon atoms, an alkoxy group with 1 to 4 carbon atoms or the group —OCOCH$_3$, or (ii) a copolymer obtained by polymerizing at least two different norbornene compounds expressed by the above formula.

2. The composition of claim 1 wherein the diene rubber (a) is isoprene rubber.

3. The composition of claim 1 wherein the diene rubber (a) is styrene-butadiene copolymer rubber.

4. The composition of claim 1 wherein the diene rubber (a) is a mixture of styrene-butadiene copolymer rubber and butadiene rubber.

5. The composition of claim 1 which is vulcanized.

6. A process for the production of the blended rubber composition of claim 1, which comprises softening the norbornene polymer or copolymer (b) with a process oil, and then blending it with the diene rubber (a).

7. The composition of claim 1 wherein component (b) is a homopolymer of the norbornene compound expressed by the general formula.

8. The composition of claim 7 wherein the norbornene compound is 5-norbornene.

9. The rubber composition of claim 1 wherein component (b) is a copolymer obtained by polymerizing at least two different norbornene compounds expressed by the general formula.

10. The composition of claim 1 wherein the norbornene compound expressed by the general formula is a member selected from the group consisting of 5-norbornene, 5-norbornene-2-methyl, 5-norbornene-2-ethyl, 5-norbornene-2-butyl, 2-methoxy-5-norbornene, 2-ethoxy-5-norbornene, 2-isobutoxy-5-norbornene, 2,3-dimethyl-5-norbornene, an acetic acid ester of 5-norbornene-2-ol, and an acetic acid ester of 5-norbornene-2,3-diol.

* * * * *